United States Patent [19]

Fussgänger et al.

[11] Patent Number: 4,957,339
[45] Date of Patent: Sep. 18, 1990

[54] OPTICAL COMMUNICATION SYSTEM, PARTICULARLY IN THE SUBSCRIBER AREA

[75] Inventors: Kurt Fussgänger, Remseck; Heinz G. Krimmel, Stuttgart, both of Fed. Rep. of Germany

[73] Assignee: Alcatel N.V., Amsterdam, Netherlands

[21] Appl. No.: 363,551

[22] Filed: Jun. 7, 1989

[30] Foreign Application Priority Data

Jun. 8, 1988 [DE] Fed. Rep. of Germany ....... 3819445

[51] Int. Cl.$^5$ ............................................. G02B 6/26
[52] U.S. Cl. ................................. 350/96.15; 455/612; 455/617
[58] Field of Search ................ 350/96.15; 455/610, 455/612, 617, 618, 619

[56] References Cited

U.S. PATENT DOCUMENTS

| | | | |
|---|---|---|---|
| 4,330,870 | 5/1982 | Arends | 455/617 |
| 4,637,072 | 1/1987 | Hellström | 455/612 X |
| 4,831,662 | 5/1989 | Kuhn | 455/617 X |
| 4,910,727 | 3/1990 | Fussgänger | 445/617 X |

FOREIGN PATENT DOCUMENTS 0265918 5/1987 European Pat. Off. .

OTHER PUBLICATIONS

M. Stern et al., "Short Wavelength Transmission on 1300 nm Optimized Single Mode Fiber", SPIE, vol. 841, Fiber Optic Networks & Coherent Technology in Fiber Optic Systems II, 1987, pp. 116–123.

Primary Examiner—Frank Gonzalez
Assistant Examiner—Phan T. Heartney
Attorney, Agent, or Firm—Christie, Parker & Hale

[57] ABSTRACT

An optical communication system in which transmission takes place in a single optical-waveguide mode by means of low-cost optical transmitters and receivers although two or more modes could propagate in the optical waveguide (1) at the operating wavelength, is supplemented by optical-waveguide sections (2, 3) between the transmitters (S, S1, S2) and receivers (E, E1, E2) and the optical waveguide (1) which are "single-mode" at the operating wavelength and contain the optical connectors (4, 5). This eliminates the need for connectors at the junctions between the optical-waveguide sections (2, 3) and the optical waveguide (1), so that no modal noise and modal dispersion can occur as a result of mode conversion.

15 Claims, 2 Drawing Sheets

OPTICAL COMMUNICATION SYSTEM, PARTICULARLY IN THE SUBSCRIBER AREA

TECHNICAL FIELD

The present invention relates to an optical communication system usable at short wavelengths.

1. Claim for Priority

This application is based on and claims priority from an application first filed in Fed. Rep. Germany on June 8, 1988 under Ser. No. 38 19 445.7.

2. Background Art

A short wavelength optical communication system is described in an article by M. Stern et al. entitled "Short-wavelength transmission on 1300 nm optimized single-mode fiber", published in SPIE Vol. 841 Fiber Optic Networks & Coherent Technology in Fiber Optic Systems II (1987), pages 116 to 123, which uses low-cost optical transmitters and receivers with an operating wavelength of about 800NM. That system also uses single-mode optical waveguide which, however, is "single-mode" only above a cutoff wavelength of 1300 nm. Nevertheless it is ensured that transmission takes place only in the fundamental mode.

This is achieved, inter alia, by mode filters which attenuate the higher-order modes and which are implemented as sections of optical waveguide functioning as single-mode optical waveguides at the operating wavelength of the optical transmitters and receivers. The optical-waveguide section at the transmitting end has one end coupled to the optical transmitter, while its other end is connected either by a connector to the optical waveguide forming the transmission link or by a fusion splice to an optical-waveguide jumper. The optical-waveguide section at the receiving end ("0.25 m 800 nm SM fiber") has one end connected by a fusion splice to the optical waveguide forming the transmission link, while the other end is not coupled directly to the receiver but spliced to a multimode pigtail coupled to the receiver. The article further states that at connectors and splices, the fundamental mode $LP_{01}$ may be partially converted to the next-higher-order mode group $LP_{11}$, and that as a result, undesired modal noise and undesired modal dispersion can occur. The only measure proposed in the article for reducing this modal noise and modal dispersion is to filter the higher-order $LP_{11}$ mode group.

DISCLOSURE OF INVENTION

It is, therefore, an object of the invention to provide an optical communication system for short-wavelength signals which represents an improvement with regard to modal noise and modal dispersion.

In accordance with the invention, "single-mode" wavelength waveguide end sections having a relatively low cutoff wavelength are fusion coupled to either end of a longer wavelength transmission link. By locating any desired optical connectors, optical couplers, and/or optical multiplexers/demultiplexers entirely within these "single-mode" end sections, modal noise and modal dispersion effects are significantly reduced. Specific embodiments of the invention may use frequency- and/or wavelength-division multiplexing.

BRIEF DESCRIPTION OF DRAWINGS

The invention will now be explained by way of example with reference to the accompanying drawings, in which.

BEST MODE FOR CARRYING OUT THE INVENTION

Figure 1:
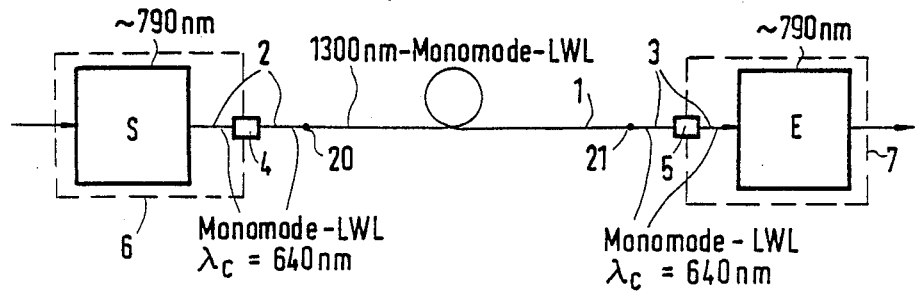
FIG. 1 illustrates the basic principle of the system according to the invention for unidirectional communication.

Like the system described in the above-mentioned printed publication or the system disclosed in EP-A-0 265 918, the system according to the invention, shown in FIG. 1, has an optical transmitter S and an optical receiver E with an operating wavelength of about 790 nm, and the transmission medium is a 1300-nm single-mode optical waveguide 1 whose cutoff wavelength typically lies between 1100 nm and 1280 nm. Suitable steps are taken to ensure that transmission takes place only in the fundamental mode, although at the operating wavelength the higherorder mode group $LP_{11}$ could also propagate in the optical waveguide 1.

According to the invention, at the transmitting end between the optical transmitter S and the optical waveguide 1 and at the receiving end between this optical waveguide 1 and the optical receiver E, there are single-mode optical-waveguide sections 2 and 3, respectively, which have a cutoff wavelength of, e.g., 640 nm and, thus, are single-mode optical waveguides at the operating wavelength. The cutoff wavelength could also be 790 nm, i.e., it only must be less than the operating wavelength. One end of each of the optical-waveguide sections 2 and 3 is spliced to the optical waveguide 1, and the other end is coupled directly to the optical transmitter S and the optical receiver E, respectively. The optical-waveguide sections 2 and 3 contain optical connectors 4 and 5, respectively.

The splices are fusion splices, which are designated throughout the figures by the reference numerals 20 and 21.

It is known that for practicability reasons, optical connectors must be present near the transmitter and near the receiver, but in prior art systems, these connectors are located not within the optical-waveguide sections serving as mode filters, but at the junctions between these optical waveguide sections and the optical waveguide forming the transmission medium. Placing the optical connector within the single-mode optical-waveguide section 2 or 3 has the advantage that in the direction of transmission behind the connector, the higher-order mode $LP_{11}$, which, as is well known, may form in any optical connector as a result of mode conversion, cannot occur, because it cannot propagate in such an optical-waveguide section. If the connector were located at the junction between the optical-waveguide section and the optical waveguide forming the transmission medium, $LP_{01}/LP_{11}$ mode conversion would take place there, and because of the resulting modal noise in the optical waveguide 1, the signal-tonoise ratio would be reduced by 1.4 dB, as was determined in a laboratory experiment. Further, measurements have shown that at low-loss fusion splices (<0.2 dB), each marked in FIG. 1 by a dot, $LP_{01}/LP_{11}$ mode conversion occurs only to an insignificant extent.

In the system according to the invention, modal noise and modal dispersion due to $LP_{01}/LP_{11}$ mode conversion are thus largely avoided.

The optical transmitter S, like the optical transmitter in the prior art system, is a 790-nm semiconductor laser of the kind commonly used for CD players, which is available at a low price.

The optical receiver E is a silicon photodiode, which is also available at low cost.

The optical transmitter is preferably a laser emitting several, e.g., 12 to 20, longitudinal modes. On the one hand, these 12 to 20 longitudinal, highly stable laser modes, whose energy propagates in the optical waveguide as an $LP_{01}$ fundamental mode, cause mode partition noise due to the material dispersion of the optical waveguide, but on the other hand, such a multimode laser has the advantage that laser feedback noise and so-called laser-mode hopping are suppressed. This is due to the fact that the light of such a laser has a short coherence length, so that the light fed back to the laser cannot interfere with the laser light in the resonator. Multimode lasers with a coherence length of 1 mm or less are especially suitable. In a corresponding single-mode laser, such an undesirable effect would occur because of the greater coherence length. It has been found that mode partition noise and material dispersion are more readily acceptable than laser feedback noise and laser-mode hopping, so that the multimode laser will be preferred to the single-mode laser.

If the communication system is to contain further optical connectors, e.g., within the optical waveguide 1, these connectors will be inserted not directly in this optical waveguide 1, but in optical-waveguide sections of the same kind as the optical-waveguide sections 2 and 3 which are then spliced into the optical waveguide 1.

The system according to the invention has the advantage of ensuring a high signal-to-noise ratio for short transmission links as are typical for the subscriber area (in an analog-signal-transmitting experimental system, the optical waveguide 1 had a length of 1.2 km, and the fiber pigtails were 2 m long. This signal-to-noise ratio is so good that even the requirements placed on analog transmission, which are much more stringent than those placed on digital transmission, can be met.

For example, analog signals from several broadband or narrow-band channels can be transmitted in a frequency-division multiplex mode by modulating different RF carriers, suitable modulation methods being amplitude modulation, frequency modulation, or frequency-shift keying. For example, a (broadband) analog television signal (video signal and associated audio signal) is modulated onto an RF carrier with a frequency of 20.7 MHz or 38.9 MHz by amplitude or frequency modulation, and a (narrow-band) analog television signal is modulated onto an RF carrier with a frequency of 0.225 MHz by either of these modulation techniques, and the mixture of these two modulated RF carriers is used to drive the laser. At the receiving end, the two signals are separated from each other by electric filtering. An advantage of analog transmission over digital transmission is that the expensive analog-to-digital and digital-to-analog converters can be dispensed with, and that signal-processing devices available at low cost, such as filters, modulators, frequency converters, etc., can be employed.

In connection with conventional analog transmission techniques, the optical communication system according to the invention permits extremely low-cost communication in the public subscriber area as well as in local networks ("LANs", "subscriber premises networks").

As for the practical implementation of the system of FIG. 1, the following should be added. The optical transmitter S, together with the associated electric controller (not shown) and the mechanical holding devices (not shown), is housed in a case 6, in whose wall the part of the connector 4 associated with the transmitter (S) is mounted. One part of the optical-waveguide section 2 is thus located within the case, and the other outside the case. One end of the part located outside the case terminates in the part located within the case, and the other end is joined to the optical waveguide 1 by a fusion splice, indicated in the drawings by a dot. The same applies analogously to the receiver E, whose case is denoted by the reference numeral 7.

A bidirectional transmission system based on the above-explained principle of the invention will now be described with the aid of FIG. 2. In this example, a first optical transmitting and receiving device, housed in a case 10, is connected to one end of the optical waveguide 1 forming the transmission medium, and a second optical transmitting and receiving device, housed in a case 11, to the other. The first optical transmitting and receiving device, shown in the figure at the left, contains an optical transmitter S1 and an optical receiver E2 which operate at the same wavelength of 790 nm. Coupled to the transmitter S1 and the receiver E2 are optical-waveguide sections which are of the same kind as the optical-waveguide sections 2 of FIG. 1. The other ends of these optical-waveguide sections are connected to a fusion coupler 8 whose cutoff wavelength is chosen so that it is "single-mode" at the operating wavelength of 790 nm. The third end of the fusion coupler 8 is connected by a fusion splice to an optical-waveguide section of the same kind as the optical waveguide section 2 of FIG. 1, which contains a connector 4 and whose other end is spliced to the optical waveguide 1 by a fusion splice. In other words, FIG. 2 differs from FIG. 1 in that a fusion coupler 8 is spliced into the optical-waveguide section 2 between the optical transmitter and the optical connector 4 and has a receiver E2 spliced thereto.

Figure 2:
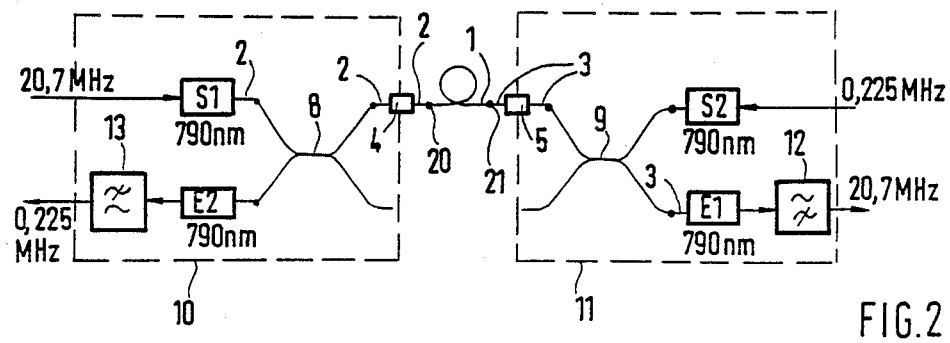
FIG. 2 shows a bidirectional system in which signals are transmitted at equal wavelengths using frequency-division multiplexing.

Correspondingly, the transmitting and receiving device shown in the right-hand portion of FIG. 2, which is housed in a case 11, contains an optical transmitter S2, an optical receiver E1 having the same operating wavelength of 790 nm as the units S1 and E2 at the distant end, and a fusion coupler 9, which are connected together and to the optical waveguide 1 in a manner analogous to that explained above for the transmitting and receiving device 10.

This system can be used for bidirectional communication as follows, for example. In one direction, in FIG. 2 from the left to the right, a broadband analog signal modulated onto a 20.7-MHz carrier or a mixture of two or more modulated RF carriers is transmitted. This modulated carrier is applied to the input of the optical transmitter S1 of the transmitting and receiving device 10. In the distant transmitting and receiving device 11, this analog signal appears at the output of the optical receiver E1 and passes through a subsequent high-pass filter 12.

In the opposite direction, an analog or digital narrow-band signal modulated onto a 0.225-MHz carrier is transmitted, the modulated carrier being applied to the input of the optical transmitter S2 of the transmitting and receiving device 11. In the distant transmitting and receiving device 10, this signal appears at the output of the optical receiver E2 and passes through a subsequent low-pass filter 13. The low-pass filter 13 in the transmitting and receiving device 10 serves to attenuate the signal with the 20.7-MHz carrier frequency from the associated transmitter S1; similarly, the high-pass filter 12 in the transmitting and receiving device 11 serves to attenuate the signal with the 0.225-MHz carrier frequency from the associated transmitter S2.

This bidirectional communication system of FIG. 2 is suited, for example, for transmitting one or more broadband and, optionally, narrow-band signals in the higher frequency band from the exchange to the subscriber, and one or more digital or analog narrow-band signals in the lower frequency band in the opposite direction, i.e., from the subscriber to the exchange.

All properties and advantages mentioned and explained in connection with the unidirectional communication system of FIG. 1 also apply to the bidirectional system of FIG. 2, particularly the advantage that — here in both directions of transmission — the requirement for a high signal-to-noise ratio can be met, so that even analog transmission is made possible, i.e., that conventional low-cost transmission equipment can be employed.

In the embodiment of the invention described so far, the optical waveguide 1 is operated at only one wavelength, either for transmission in a single direction (FIG. 1) or for bidirectional transmission (FIG. 2). It is also possible, of course, to operate the optical waveguide 1 in a wavelength-division multiplex mode by connecting a second transmitting and receiving device to each end of the optical waveguide 1 via wavelength-division multiplexer/demultiplexers, these second transmitting and receiving devices having a second operating wavelength, e.g., 840 nm. For this wavelength, too, low-cost lasers as are commonly used for laser printers are available. Aside from having a different operating wavelength, these second transmitting and receiving devices may be identical in construction to the transmitting and receiving devices shown in FIG. 2, so they need not be explained again or shown in a drawing. Such a system with two transmitting and receiving devices at each end of the optical waveguide 1 can be used if two subscribers are to be supplied from an exchange over a single optical waveguide and also have to transmit signals to the exchange.

Figure 3:
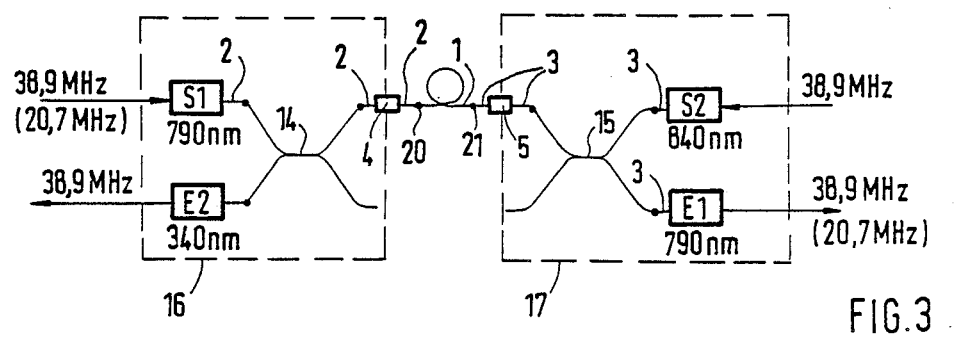
FIG. 3 shows a bidirectional system using wavelength-division multiplexing.

A further embodiment of the invention is shown in FIG. 3. As in FIG. 2, an optical transmitting and receiving device 16, 17 is present at each end of the optical waveguide 1 and contains an optical transmitter and an optical receiver, so that bidirectional communication is possible. In each of the two transmitting and receiving devices 16 and 17, the operating wavelength of the optical transmitter is different from that of the optical receiver, and the fusion coupler 14, 15 is a wavelength-selective coupler which is "single-mode" at the two operating wavelengths and capable of separating optical signals with the different wavelengths, so that the receiver E2 in the transmitting and receiving device 16 can only be reached by light of one wavelength, e.g., 840 nm, and the receiver E1 in the transmitting and receiving device 17 by light of the other wavelength, e.g., 790 nm.

Instead of the fusion couplers 14 and 15, other wavelength-selective couplers can be used in conjunction with a single-mode fiber pigtail, e.g., sharp-cutoff interference filters or grating couplers.

Because of the wavelength separation, the same frequencies can be used in both directions of transmission for modulating the optical transmitters, e.g., a 38.9-MHz carrier and, if necessary, further carriers, e.g., a 20.7-MHz carrier if analog signals are to be transmitted. It is also possible, of course, to transmit digital signals with this system, e.g., a 280-Mb/s signal from an exchange with the transmitting and receiving device 16 to a subscriber with the transmitting and receiving device 17, and a 140-Mb/s signal in the opposite direction. The system of FIG. 3 thus serves to transmit analog or digital signals using wavelength-division multiplexing and frequency-division multiplexing.

In the system of FIG. 3, like in the systems of FIGS. 1 and 2 the transmission equipment required at the transmitters and receivers, such as modulators, converters, etc., is not shown. These other parts of the system of FIG. 3 may be identical in construction to the correspondingly designated parts of FIGS. 1 and 2, so they need not be explained again.

In a further embodiment of the invention, an additional transmitting and receiving device is coupled to each end of the optical waveguide 1. These additional transmitting and receiving devices operate in the same manner as the transmitting and receiving devices 16 and 17 of FIG. 3, but at a different pair of wavelengths, e.g., at the wavelength pair 1180 nm and 1220 nm. The two transmitting and receiving devices at each end of the optical waveguide 1 are then coupled to the latter by means of so-called bidirectional optical multiplexer-demultiplexers; in this case, too, the principle of the invention that the connectors necessary in the system are inserted in optical-waveguide sections which are "single-mode" at the operating wavelengths is applied.

In this embodiment, the fiber pigtail projecting from each of the two transmitting and receiving devices is spliced not directly to the optical waveguide 1 as in FIGS. 1 to 3, but to two ends of a fusion coupler which has its third end spliced to the optical waveguide 1. This fusion coupler forms the bidirectional wavelength-division multiplexer/demultiplexer and, like the optical waveguide 1, is "single-mode" only clearly above the operating wavelengths. The same applies analogously to the connection of the two transmitting and receiving devices at the other end of the optical waveguide 1.

The advantages of the invention, which were explained above in connection with the embodiments described, also apply to communication in both directions with the aid of the second wavelength pair. As in the comparable example described above, such a system can be used if not only one, but two subscribers are to be connected to an exchange via a single optical waveguide to provide bidirectional communication for each subscriber.

Figure 4:
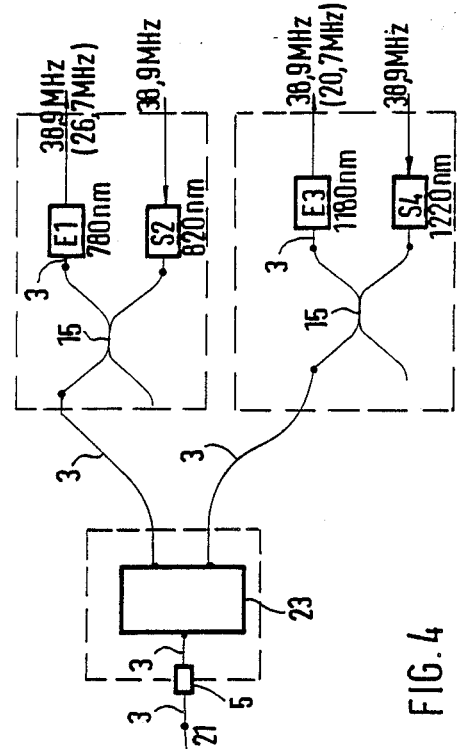
FIG. 4 shows a doubly bidirectional system using wavelength-division multiplexing.
Figure 5:
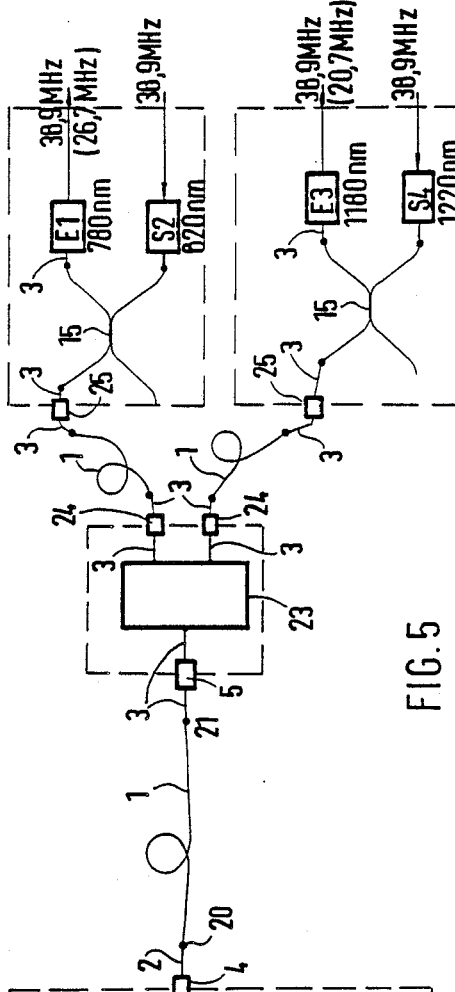
FIG. 5 shows a modification of the system of FIG. 4.

FIGS. 4 and 5 show further embodiments of the invention in which, like in the embodiment just described, not only one, but two bidirectional connections can be established over the optical waveguide 1. The system of FIG. 4 differs from the system of FIG. 3 as follows.

A bidirectional optical wavelength-division multiplexer/demultiplexer 22 is spliced between the fusion coupler 14 and the optical connector 4. Via this wavelength-division multiplexer/demultiplexer 22, a second optical transmitting and receiving device, consisting of a transmitter S3 and a receiver E4, is coupled to the optical-waveguide section 2. The pair of operating wavelengths of this second optical transmitting and receiving device differs from that of the first optical transmitting and receiving device, consisting of the transmitter S1 and the receiver E2. In the embodiment shown, the first transmitting and receiving device has the operating wavelengths 780 nm and 820 nm, and the second optical transmitting and receiving device has the operating wavelengths 1180 nm and 1220 nm. Aside from the fact that the two transmitting and receiving devices operate at different wavelength pairs, there are no differences.

The bidirectional optical wavelength-division multiplexer/ demultiplexer 22 ensures that the two wavelength pairs cannot reach the respective other transmitting and receiving device, but can reach the optical waveguide 1.

At the opposite end, the system of FIG. 4 differs from that of FIG. 3 in that a bidirectional optical wavelength-division multiplexer/demultiplexer 23 is spliced between the connector 5 and the fusion coupler 15. Via this bidirectional wavelength-division multiplexer/demultiplexer, a second optical transmitting and receiving device, consisting of an optical transmitter S4 and an optical receiver E3, which operate at the wavelength pair 1180 nm and 1220 nm, is connected to the optical waveguide 1. These two transmitting and receiving devices are connected to the device 23 via optical-waveguide sections 3 of the same kind as the optical-waveguide sections mentioned above.

Thus, not only one bidirectional connection is provided over the optical waveguide 1 (at a first pair of wavelengths), but a second, likewise bidirectional connection (at a second pair of wavelengths).

In this embodiment of the invention, too, the optical connectors and all wavelength-division-multiplexing-/demultiplexing devices are contained in the optical-waveguide sections 2 and 3, so that the same advantages as those explained above are gained.

The system of FIG. 5 differs from that of FIG. 4 in that the connections between the bidirectional optical wavelength-division multiplexer/demultiplexer 23 and the two fusion couplers 15 are somewhat more complex than in FIG. 4. Seen from the coupler 15, each of these connections consists of an optical-waveguide section 3 spliced to one end of the coupler 15, an optical waveguide 1 spliced to the optical-waveguide section 3, and an optical-waveguide section 3 spliced between this optical waveguide 1 and the bidirectional optical wavelength-division multiplexer/demultiplexer 23, with the optical-waveguide sections 3 containing optical connectors 24 and 25 which are mounted in case walls in a manner similar to that explained with reference to FIG. 1. As in all examples explained so far, the optical-waveguide sections 3 are single-mode optical waveguides at the operating wavelengths, whereas the optical waveguide 1 is the single-mode optical waveguide optimized for transmission in the 1300-nm range, which, however, is "single mode" only clearly above the operating wavelength.

Both embodiments, FIG. 4 and FIG. 5, are suitable for connecting two or more subscribers to an exchange, shown in the figures at the left, with bidirectional communication being possible between the exchange and each of the subscribers. In FIG. 5, the device 23 associated with the subscribers is located further from the subscribers as in FIG. 4, so that more complex connections, containing not only optical-waveguide sections, must be provided between this device and the subscribers.

Unlike in the prior art system referred to at the beginning, the multiplexing/demultiplexing devices are contained not in the optical waveguide 1 operated below its cutoff wavelength, but in optical-waveguide sections operated above their cutoff wavelength.

We claim:

1. Optical communication system usable with an optical signal having a predetermined wavelength, said system comprising:
    at least one optical transmitter for transmitting said optical signal,
    at least one optical receiver for receiving said optical signal,
    an optical waveguide transmission link, coupling said optical transmitter with said optical receiver and comprising
    a first optical waveguide segment having an associated cutoff wavelength above which only the fundamental mode of an optical signal can propagate, said cutoff wavelength being above said predetermined wavelength,
    second and third optical waveguide segments each having an associated cutoff wavelength which is below said predetermined wavelength, whereby said second and third said optical waveguide segments each functions as a single-mode optical waveguide at said predetermined wavelength,
    a fusion splice for permanently coupling a first end of the second optical waveguide segment to a first end of said first waveguide segment, and
    an optical connector for removably connecting a second end of the second optical waveguide segment to an adjacent first end of the third optical waveguide segment,
    wherein said optical connector and any other removable optical connections incorporated in the optical waveguide transmission link between the optical transmitter and the optical receiver are all located between two adjacent optical-waveguide segments which both have a cutoff wavelength below said predetermined wavelength.

2. A system as claimed in claim 1, wherein the optical transmitter is a semiconductor laser emitting several longitudinal modes and the third optical waveguide segment is fixedly coupled to said optical transmitter.

3. Transmitting device for an optical communication system wherein an optical signal is transmitted over an optical waveguide link in a single, fundamental mode and at an operating wavelength lower than the cutoff wavelength of the optical waveguide link, said transmitting device comprising:
    an optical transmitter,
    an optical waveguide end section having a first end coupled to the optical transmitter, said end section having a cutoff wavelength below said operating wavelength whereby it functions as a single-mode optical waveguide for optical signals having said operating wavelength,
    an optical connector inserted in said end section between the first end and a second end thereof, and
    a fusion splice for joining the second end of said end section to the optical waveguide link.

4. A transmitting device as claimed in claim 3, further comprising means for modulating analog narrow-band and/or broadband electric signals onto one or more RF carriers and for applying the modulated RF carrier or a mixture of the modulated RF carries as a control signal to the optical transmitter.

5. A transmitting device as claimed in claim 3 further comprising:
an optical coupler spliced into the optical waveguide end section,
an optical receiver coupled via the coupler to said end section for receiving optical signals originating at a second end of said transmission link, and
means for transmitting signals in a first direction from said optical transmitter and in a second direction to said optical receiver using frequency-division multiplexing,
wherein the optical receiver and the optical transmitter each have an operating wavelength equal to said predetermined wavelength.

6. A transmitting device as claimed in claim 3, further comprising:
a wavelength-selective coupler spliced into the optical waveguide end section,
an optical receiver coupled via the coupler (14) to said end section for receiving optical signals originating at a second end of said transmission link, and
means for transmitting signals in a first direction from said optical transmitter and in a second direction to said optical receiver using wavelength-division multiplexing,
wherein the optical transmitter and the optical receiver have respective different operating wavelengths less than said cutoff wavelength.

7. The system of claim 5 wherein said optical coupler is a fusion coupler.

8. Receiving device for an optical communication system wherein an optical signal is transmitted over an optical waveguide link in a single, fundamental mode and at an operating wavelength lower than the cutoff wavelength of the optical waveguide link, said receiving device comprising:
an optical receiver
an optical waveguide end section having a first end coupled to the optical receiver, said end section having a cutoff wavelength below said operating wavelength, where it functions as a single-mode optical waveguide for optical signals having said operating wavelength,
an optical connector inserted in said end section between the first end and a second end thereof, and
a fusion splice for joining the second end of said end section to the optical waveguide link.

9. A receiving device as claimed in claim 8, further comprising
means for separating a mixture of electric signals into individual modulated RF carriers and for demodulating the latter.

10. Bidirectional optical communication system usable with short wavelength optical signals having a predetermined wavelength, said system comprising:
an optical waveguide transmission link comprising a waveguide having an associated cutoff wavelength above which only the fundamental mode of an optical signal can propagate, said cutoff wavelength being above said predetermined wavelength,
a first optical transmitter disposed at a first end of the transmission link for transmitting a first said short wavelength optical signal,
a first optical receiver disposed at a second end of the transmission link for receiving said first optical signal,
a second optical transmitter disposed at the second end of the transmission link for transmitting a second said short wavelength optical signal,
a second optical receiver disposed at the first end of the transmission link for receiving said second optical signal,
means for transmitting signals in a first direction from said first optical transmitter to said first optical receiver and in a second direction from said second optical transmitter to said second optical receiver using frequency-division multiplexing, and
first and second mode filters respectively disposed at said first and second ends of the transmission link for attenuating higher-order modes other than said fundamental mode, each said mode filter comprising
a short wavelength optical waveguide section having an associated cutoff wavelength which is below said predetermined wavelength, whereby said short wavelength section functions as a single-mode optical waveguide at said predetermined wavelength,
a fusion splice for permanently coupling a first end of the short wavelength section to said waveguide,
optical coupler means for coupling a respective said optical transmitter and a respective said optical receiver to a common terminal adjacent said short wavelength section by means of three respective optical waveguide pigtails each having an associated cutoff wavelength which is below said predetermined wavelength, whereby each of said pigtails functions a single-mode optical waveguide at said predetermined wavelength, and
an optical connector for removably connecting a second end of the short wavelength section to the common terminal of the optical coupler means, whereby the transmission link may be removably connected to an associated optical transmitter and optical receiver,
wherein
all said optical transmitters and receivers have an operating wavelength equal to said predetermined wavelength, and
all optical connectors and optical couplers in the system are terminated by optical waveguide components which have a cutoff wavelength below said predetermined wavelength.

11. The system of claim 10, wherein said optical coupler means comprises a fusion coupler which is integrally formed with said three pigtails.

12. Bidirectional optical communication system usable with short wavelength optical signals having predetermined wavelengths, said system comprising:
an optical waveguide transmission link comprising a waveguide having an associated cutoff wavelength above which only the fundamental mode of an optical signal can propagate, said cutoff wavelength being above said predetermined wavelengths,
a first optical transmitter disposed at a first end of the transmission link for transmitting a first said short wavelength optical signal having a first said predetermined wavelength, a first optical receiver disposed at a second end of the transmission link for receiving said first optical signal, a second optical transmitter disposed at the second end of the transmission link for transmitting a second said short wavelength optical signal having a second said predetermined wavelength different from said first predetermined wavelength, a second optical receiver disposed at the first end of the transmission link for receiving said second optical signal, means for transmitting signals in a first direction from said first optical transmitter to said first optical receiver and in a second direction from said second optical transmitter to said second optical receiver using wavelength-division multiplexing, and first and second mode filters respectively disposed at said first and second ends of the transmission link for attenuating higher-order modes other than said fundamental mode, each said mode filter comprising four short wavelength waveguide sections each having an associated cutoff wavelength which is below said predetermined wavelengths, whereby each said short wavelength waveguide section functions as a single-mode optical waveguide at said predetermined wavelengths, a fusion splice for permanently coupling a first end of a first said short wavelength waveguide section to said waveguide, a wavelength-selective coupler for connecting a fourth said short wavelength waveguide section with said second and third said short wavelength waveguide sections, and an optical connector for removably connecting a second end of the first section to an adjacent first end of the fourth section, whereby the transmission link may be removably connected to the optical transmitters and optical receivers disposed coupled to a particular end thereof, wherein one transmitter-receiver pair has an operating wavelength different from that of the other transmitter-receiver pair, and any other optical connectors or optical couplers are located between short wavelength optical waveguide sections which have a cutoff wavelength below said predetermined wavelengths.

13. A bidirectional optical communication system as claimed in claim 12, further comprising a third optical transmitter disposed at the first end of the transmission link for transmitting a third said short wavelength optical signal having a third said predetermined wavelength different from said first and second predetermined wavelengths, a third optical receiver disposed at the second end of the transmission link for receiving said third optical signal, a fourth optical transmitter disposed at the second end of the transmission link for transmitting a fourth said short wavelength optical signal having a fourth said predetermined wavelength different from said first, second and third predetermined wavelengths, a fourth optical receiver disposed at the first end of the transmission link for receiving said fourth optical signal, a first bidirectional optical wavelength-division multiplexer/demultiplexer between the fourth optical-waveguide section and the wavelength-selective coupler at the first end of the transmission link for coupling the transmission link also to the fourth optical receiver and to the third transmitter disposed at said first end, and a second bidirectional optical wavelength-division multiplexer/demultiplexer between the fourth optical-waveguide section and the wavelength-selective coupler at the second end of the transmission link for coupling the transmission link also to the third optical receiver and to the fourth optical transmitter disposed at said second end, whereby a plurality of bidirectional connections may be transmitted simultaneously over the optical waveguide by wavelength-division multiplex operation.

14. The system of claim 12 wherein said wavelength-selective coupler is a sharp-cutoff interference filter.

15. The system of claim 12 wherein said wavelength-selective coupler is a grating filter.

* * * * *